Feb. 25, 1969 R. B. MARS 3,429,572
EDUCATIONAL GAME
Filed Oct. 11, 1965
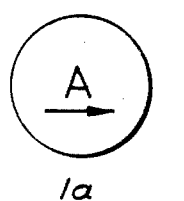 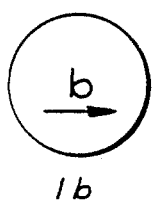 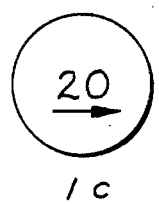
1a  1b  1c
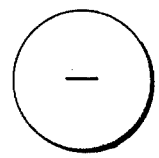 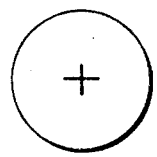 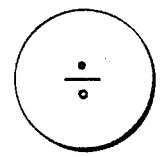 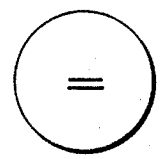 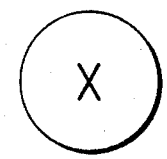
1d  1e  1f  1g  1h
FIG. 1
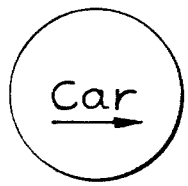 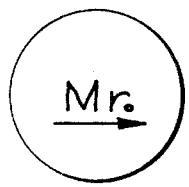 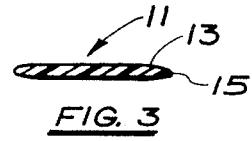
FIG. 3
2a  2b
FIG. 2
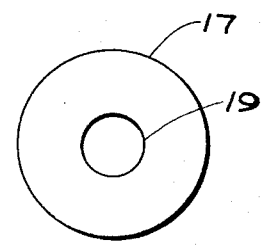
FIG. 4
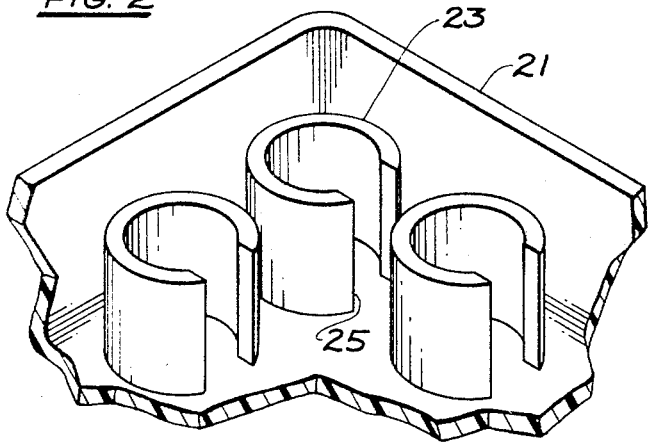
FIG. 5
INVENTOR.
ROBERT B. MARS
BY
Stuart W. Wohlgemuth
ATTORNEY

United States Patent Office 3,429,572
Patented Feb. 25, 1969

3,429,572
EDUCATIONAL GAME
Robert B. Mars, 21035 Costanso,
Woodland Hills, Calif. 91364
Filed Oct. 11, 1965, Ser. No. 494,480
U.S. Cl. 273—95                      5 Claims
Int. Cl. A63f 9/02; A63h 33/00

ABSTRACT OF THE DISCLOSURE

An educational game comprising a plurality of flat discs which have indicia on one side thereof, such as letters of the alphabet, or numbers or words or mathematical symbols. The discs are in sets according to the type of indicia thereon. The discs are capable of being flipped over to expose the indicia by a provided additional flipper disc.

---

This invention relates to an educational game. More particularly the invention relates to an educational game enabling a child to develop word, spelling, and mathematical skills.

I have found through many years experience as an elementary school teacher in the lower grades that young children can learn spelling, arithmetic, and reading by means of a game as compared to rigid, normal instruction. Particularly, and of great importance, I have observed that children will learn to develop these skills when associating physical action with mental action. In other words, if the child is engaged in the physical participation, his interest-attention span and even ability of retention is increased when he is exposed to and attempting to learn vocabulary, reading, and arithmetic. As a result, I have invented the game described herein so that the child associates a physical movement with the mental thought process required to identify words to do arithmetic or to even form sentences. The child will thus be brought physically into the act of learning.

Thus, it is an object of this invention to provide an educational game that is simple for a child to learn and play.

Another object of this invention is to provide an educational game that requires a physical motion in combination with a thought process.

A further object of this invention is to provide an educational game that permits creativity and flexibility so that the game can be adjusted to the ability of the player or players involved.

Another object of this invention is to provide an educational game that can be adequately played by a single child and does not require group participation.

Still another object of the invention is to provide an educational game that can be utilized by several players in a competitive manner.

The above and other objects of the invention will become apparent from the following detailed description.

The educational game of this invention is comprised of a plurality of disc members having indicia on one side thereof wherein the disc members are flat and tapered at the periphery, so that upon pressure exerted at the periphery by a second disc member the disc can be caused to flip. Thus, it can be seen that the disc members comprising the game are similar to the disc members utilized in a well-known game of "tiddlywinks" in the sense that the herein game comprises the flipping of the disc having indicia thereon. The game can be likened in this physical movement to "tiddlywinks." However, this is the only similarity with the game, as will be shown. The indicia upon the face of the discs will vary from simple words to capital letters, to lower case letters, to numbers and arithmetic symbols. The discs in each of the above categories are preferably different colored to indicate the particular class thereof. The game is played by placing the disc with the indicia side face down upon a flat surface so that the players have no knowledge of the indicia on the disc. A flipper disc is then utilized to cause the disc chosen to selectively flip exposing the indica thereon in the manner that one does in a "tiddlywink" game. Through this the child exerts and partakes in a physical exertion and development of physical skill. He then will identify the disc and use it in a manner to play the game as will be further described.

The details of the variations of the games involved utilizing the various classes of discs provided will be further explained in detail with relation to the drawing in which:

FIGS. 1a through 1h depict a disc having indicia thereon representative of capital letters, lower case letters, numbers, and arithmetic symbols, respectively.

FIGS. 2a and b represent discs of a slightly larger size than those in FIGS. 1a through 1h and contain words thereon.

FIG. 3 is a cross-section of a typical disc of the game.

FIG. 4 is a top view of a flipper disc.

FIG. 5 is a pictorial representation of a portion of a container-box used to store the discs prior and during the playing of the game.

Turning now to FIG. 1a there is shown a round disc having a capital letter as the indicia on one side thereon. This disc may, for example, be colored yellow with the indica having a black imprint thereon. The game contemplated will comprise a set of the alphabet in capital letters. In fact, the game can be comprised of two sets of the alphabet in capital letters or alternatively comprise the alphabet with several discs of vowels in addition to the alphabet. Generally, however, the plurality of the alphabet is most desirable with the smaller letters, as will be explained. If we were to play the game utilizing the capital letter discs, all of the discs of the capital letters are placed face down on a rug or some flat cloth-covered surface. A player using a flipper disc, which will be further described with relation to FIG. 4, flips the chosen letter disc as he chooses. If the disc lands face up, after the flip, the child tries to identify it; if he identifies it he places it in alphabetical order or on an alphabet chart which may be provided in the game set. If the child cannot identify it, and he is playing alone, he can put the disc aside. He flips another one. If more than one is playing, the next player in order gets a turn to identify the disc when the preceding player fails. Then a new player flips a new disc. A player who successfully identifies the disc gets it for his collection. The one with the largest collection will win the game.

It has been found that for learning the letters of the alphabet, children are better able to accomplish this utilizing the capital letters. Thus, the simple process of learning letters and identification thereof can be played in the above described manner utilizing the capital letter discs of FIG. 1a. Variations on the capital letter game are available. For example, the winner of the game might be, instead of the one with the largest collection, the one who can spell the most words with the letters he has collected. This, of course, is for a more advanced stage where the child can spell. It is to be noted that the indicia shown on FIG. 1a has an arrow under the letter. It has been found that the utilization of an arrow is preferable for two reasons when teaching children letters and words. First, the arrow serves to underline the letter so that the child can learn the correct position of the letter or word. Secondly, by utilizing an arrow pointing in a direction the child then forming words from letters or when reading groups of words can develop the skill in reading from left to right. Thus, it is preferable that the words and letters used as indicia in the game be underscored with arrows.

Turning now to FIG. 1b there is shown a small letter b as the indicia upon one side of the plain disc. The small letter disc may, for example, be differentiated from the other discs by being colored red with a black imprint for the indicia. The game is played the same way as the capital letter game with players alternately taking turns flipping the disc, retaining the disc that has been successfully flipped over and identified. The winner of such a game can be determined by the player who forms the first word or a specific number of words, or words that contain a smaller word, such as "about" which contains the word "out," "think" which contains the word "ink," or "still" which contains the word "ill." There are numerous variations in the playing of this game which is essentially a word game. As can be appreciated, it is desirable that more than one and at least three sets of the alphabet be available in the small letter discs. Additionally, it is desirable that a plurality of the vowels be present in order that words can be successfully formed.

Turning now to the variety of the game for developing arithmetic skills, attention is directed to FIG. 1c, where is shown the number 20 underlined. The number game to develop arithmetic skills can be in a separate container and form an entirely separate game from that used for developing reading and word skills. However, when the discs are combined into one container in one single game, it would obviously be preferable that the number discs have an identifying color. Thus, for example, the numbered discs could be colored light green with a black imprint for the even numbers, with a light blue and black imprint of indicia for the odd numbers. To play the simplest of numbered games, only the numbered discs are utilized. The player plays the game in the same way previously described and using the same theory as in the capital letter game wherein he retains those discs successfully identified. The winner could, for example, be the first to earn all the number discs in order. The numbers can be whatever desired, ranging from 1 to 25, 1 to 50, or up to 1 to 100. A numbered chart can be provided with the game so that the player can place the disc on the number on the chart which further helps him associate the disc. Alternatively, the winner of the game, for example, as chosen, could be the one that retains the greatest number of the discs.

After a child has been able to, of course, learn and identify numbers, or to gain arithmetic skills, the symbols of FIGS. 1d through h are then utilized. The symboled discs as with the others previously described can selectively be colored to identify the symbol. For example, the subtraction sign of 1d could be pink with a black imprint; the addition sign of 1e could be dark blue with a white imprint; the division sign of disc 1f could be violet with a black imprint; the equal sign of FIG. 1g may be black with a white imprint; and the multiplication sign of FIG. 1h may selectively be orange with a black imprint. In order to play any of the games utilizing the symbols, children flip a numbered disc, and after correctly identifying it will set it aside to shat it can become part of a complete equation which he attempts to form. The player forming the first equation or multi equations could be the winner. Thus, for example, a player will first flip a number disc then a multiplication, addition, subtraction, or the like symbol and then a second numbered disc. He will then flip an equal disc and try to answer the equation formed. It should be apparent that many variations of the number game are available utilizing the disc. For exmple, all of the symbols can have the same color with the child not knowing what the equation will be when he flips a symboled disc.

Turning now to the word discs which are slightly larger in order to accommodate the words, attention is directed to FIGS. 2a and b. FIG. 2a depicts the simple word "car" while 2b shows the word "Mr." Often a set of word discs will comprise an entire package separate from letters or numbers, depending upon the complexity of the game desired. In order to play this game, the word disc which, for example, could be white with black imprint, so as to differentiate them from the other discs when they are so combined are flipped in the manner previously described. The winner of the game may be the player who forms the first complete sentence, or the sentence with the most words. Alternatively, the child who is able to form the most sentences utilizing all the discs in the game he has retained.

Referring to FIG. 3 there is shown in cross section the disc 11 utilized to play the described game. As can be seen, the disc is tapered 13 at its outer periphery to a slightly rounded edge 15, preferably, so as to enable the disc to be easily flipped. As shown in FIG. 4, the flipper disc 17 is of slightly larger diameter than the word or letter disc so as to enable the child to better grip it. The flipper disc 17 is also rounded at its periphery for contact with the word or letter disc. Preferably the flipper disc has a hole 19 in the center thereof wherein the child can more easily grip it by placing his thumb over the opening. This, of course, is not needed but does facilitate better utilization of the flipper disc.

FIG. 5 depicts part of the box in which the game is stored. It is generally desirable that an orderly means be present for the child or children playing the same to store the discs utilized. As can be seen the box 21 has a plurality of cylindrical members 23 disposed therein. Each cylinder has a vertical opening 25 therein which is light enough so that the child can place his finger therein to grasp the chips within the cylinder. The box is not required in order to play the game, however, it does present a desirable storage medium for the discs. Additionally, the cover of the container can have thereon duplications of the indicia on the discs. This enables the child to place the disc uncovered in its proper order in the sequence of letters or numbers concerned.

Although the invention has been described and illustrated in detail, it is to be clearly understood that the same is by way of illustration and example only and is not to be taken by way of limitation, the spirit and scope of this invention being limited only by the terms of the appended claims.

I claim:
1. An educational tiddly-wink type comprising:
   a plurality of flat rigid discs,
   indicia on only one side of said discs, said indicia being visible only when the indicia side of a disc is presented for view,
   said discs being in various sets of different forms of indicia with each set comprised solely of one form of indica,
   said sets of indicia comprising letters of an alphabet, numbers, words, and mathematical symbols,
   and means for causing said discs to flip over to expose said indicia when said indicia side is unexposed.
2. The game of claim 1 wherein each set of said discs is provided with a differentiating color to indicate the type of indicia thereon.
3. The game of claim 1 wherein said means for flipping said discs is a tapered flat disc having an aperture at the center thereof.
4. The game of claim 2 wherein said indicia are underlined to indicate proper orientation.

5. The game of claim 4 wherein said underline is in the form of an arrow pointing from left to right.

References Cited

UNITED STATES PATENTS

| 209,307 | 10/1878 | Trickey | 35—35 |
| 1,280,082 | 9/1918 | Pierson. | |
| 1,539,357 | 5/1925 | Johnson | 273—95 |
| 3,063,164 | 11/1962 | Pellegrino et al. | |

ANTON O. OECHSLE, *Primary Examiner.*

M. R. PAGE, *Assistant Examiner.*

U.S. Cl. X.R.

35—70, 71